United States Patent [19]

Pexton

[11] Patent Number: 4,623,952
[45] Date of Patent: Nov. 18, 1986

[54] DAMPED STATIC ELIMINATOR FOR DISK DRIVES

[75] Inventor: Harold W. Pexton, Moore, Okla.

[73] Assignee: Magnetic Peripherals Inc., Minneapolis, Minn.

[21] Appl. No.: 823,234

[22] Filed: Jan. 28, 1986

[51] Int. Cl.[4] .................. H05F 3/00; H02K 7/00; F16M 13/00
[52] U.S. Cl. ............................. 361/220; 248/632
[58] Field of Search ............. 361/212, 220; 248/632, 248/633; 310/90, 68 B, 68 C

[56] References Cited

U.S. PATENT DOCUMENTS 4,038,693  7/1977  Huffine et al. ............. 361/220 X
4,585,963  4/1986  Wilkinson, Jr. et al. ....... 361/212 X Primary Examiner—L. T. Hix
Assistant Examiner—Douglas S. Lee
Attorney, Agent, or Firm—Robert M. Angus; Joseph A. Genovese

[57] ABSTRACT

A static eliminator comprises a contact mounted to a gimbal spring backed by a damping pad supported by a load spring. The contact bears against the polished end surface of the motor shaft of a disk drive so static electricity is grounded through the gimbal. The geometric arrangement of the contact and shaft is such as to prevent generation of vibration and excess noise as the spindle rotates.

2 Claims, 3 Drawing Figures

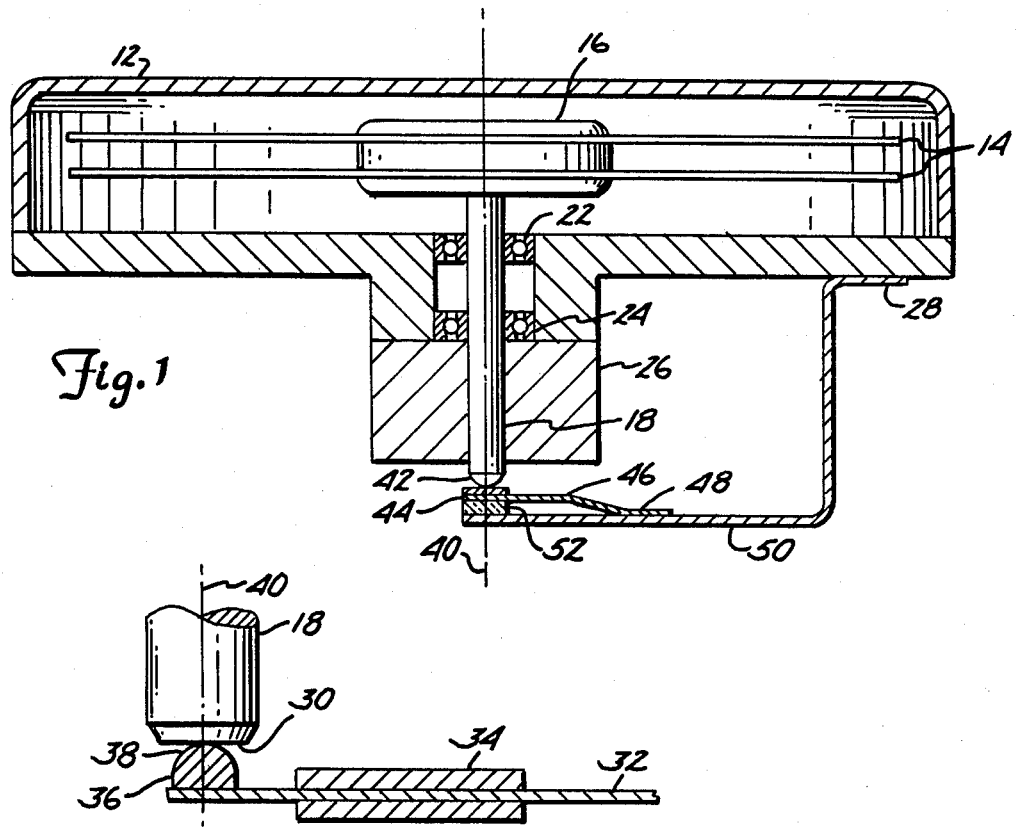
Fig. 1
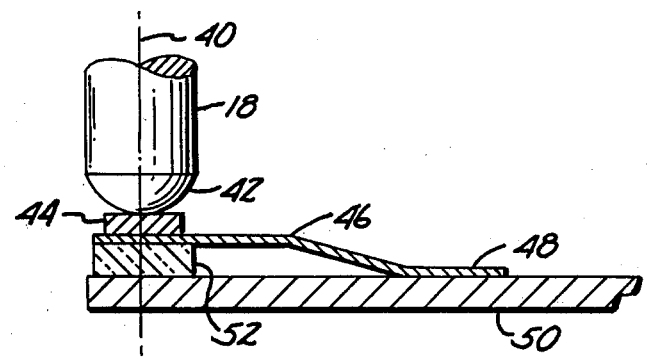
Fig. 2 Prior Art
Fig. 3

DAMPED STATIC ELIMINATOR FOR DISK DRIVES

This invention relates to static eliminators for disk drives.

One problem associated with magnetic disk drives is the generation of static electricity. It is common in magnetic disk drives to provide a ground contact on the end of the motor spindle to ground or eliminate static electricity. However, the high contact pressure between the contact and the revolving spindle, together with a slight off-center of the contact point, can generate vibration and audible noise which is intolerable in the disk drive. Furthermore, the grinding of the contact can wear to an intolerable level in just a few weeks. The present invention resides in an improved contact damping apparatus for reducing static electricity in a disk drive.

In accordance with the present invention, a contact includes a flat contact head supported on a gimbal spring and backed with a damping pad. The gimbal spring provides electrical contact to the grounding element. The flat contact head engages a rounded end of the motor shaft.

One feature of the present invention resides in the fact that misalignment of the contact will not generate unacceptable noise with the spinning motor shaft.

Another feature of the present invention resides in the fact that the contact is supported by the damped gimbal spring, thereby providing less pressure on the motor and enabling the contact to follow motor position without undue wear.

The above and other features of this invention will be more fully understood from the following detailed description and the accompanying drawings, in which:

FIG. 1 is a section view of a disk drive having a static eliminator contact in accordance with the presently preferred embodiment of the present invention;

FIG. 2 is an enlarged section view, as in FIG. 1, of a static eliminator contact in accordance with the prior art;

FIG. 3 is a section view, partly in cutaway cross-section, of an enlarged static eliminator contact, as in FIG. 1, showing the static eliminator contact in accordance with the presently preferred embodiment of the present invention.

FIG. 1 illustrates a disk drive having a static eliminator contact in accordance with the presently preferred embodiment of the present invention. The disk drive includes a support 10 supporting a housing 12 enclosing one or more disks 14 mounted to hub 16 supported by spindle 18. Spindle 18 is journaled to support 10 by bearings 22 and 24, and is driven by motor 26 having usual stator and rotor elements. The static eliminator contact, to be described in greater detail, is fastened to support 10 at 28.

Referring to FIG. 2, there is illustrated a static eliminator contact in accordance with the prior art wherein the motor spindle 18 has a relatively flat bottom surface 30. Spring lever 32 carries a stiffener 34, such as a head shrinked tube, and a contact 36 having a rounded surface 38. Spring lever 32 was mounted or spot welded to support 10 at point 28 as illustrated in FIG. 1. Typically, the spring 32 and stiffener 34 provided approximately 75 to 100 grams of pressure at the contact point of surface 38 to surface 30. If the geometry of the static eliminator contact was correct, surface 38 made contact with surface 30 coaxial with axis 40 of spindle 18, and was little likelihood that objectionable frictional noise would be generated. However, if the contact point of surface 38 was off axis 40, or if the spindle slightly wobbled on its axis, noise was generated by the scrapping contact between the surface 38 and surface 30. For example, if the contact point of surfaces 38 and 30 is slightly off the axis 40 of spindle 18, surface 38 will effectively track in a circle on surface 30, generating noise as the spindle rotates. Furthermore, debris build up and wear also contributed to misalignment of the contact point and noise generation.

FIG. 3 illustrates the preferred embodiment of a gimbaled static eliminator contact in accordance with the presently preferred embodiment of the present invention. In FIG. 3 the end of the motor shaft 18 is preferably rounded as illustrated by surface 42. Flat contact 44 is supported on gimbal spring 46 spot welded at 48 to load spring 50 which in turn is spot welded to structure 10 at point 28. A soft polyurethane dampening pad 52 is supported by support 50 to bias the contact 44 against the curved, surface 42 of shaft 18. As an example, gimbal spring 46 may be constructed of 0.002-inch phosphorous bronze springstock and load spring 50 may be constructed of 0.015-inch phosphorous bronze. The surface 42 of shaft 18 may be formed of a #440 stainless steel polished ball bearing set into the end of shaft 18 or a rounded cap mounted onto the end of the shaft.

With a static eliminator contact in accordance with the presently preferred embodiment of the present invention, the contact head is urged against the surface 42 of shaft 18 and is damped by pad 52. Furthermore, due to the curved surface 42 bearing against contact 44, minor misalignments of the contact 44 to the shaft will not generate unacceptable noise, as long as the flat surface of contact 44 is near perpendicular to the axis 40 to the rotation of shaft 18 so that contact is made coaxial with axis 40.

The present invention thus provides an effective static eliminator contact for disk drives. The contact is effective in operation and efficient in use.

This invention is not to be limited by the embodiment shown in the drawings and described in the description, which is given by way of example and not of limitation, but only in accordance with the scope of the appended claims.

What is claimed is:

1. A damped contact assembly for electrically grounding the motor shaft of a disk drive to the housing of the disk drive, comprising: a load spring adapted to be fastened to the housing of the disk drive; a damping pad mounted to said load spring in a position which intersects the axis of rotation of said shaft; a gimbal spring mounted to said load spring; and a contact head mounted to said gimbal spring adjacent said damping pad to engage at end of said shaft, whereby said contact head is urged against said shaft end by said load spring and is damped by said damping pad.

2. A damped contact assembly according to claim 1 wherein said shaft end is rounded in a partial spherical surface and said contact head has a flat surface which engages said spherical surface at a location coincident with said axis.

* * * * *